(12) United States Patent
Robl et al.

(10) Patent No.: US 11,689,614 B2
(45) Date of Patent: Jun. 27, 2023

(54) CONFIGURATION METHOD FOR TRANSMITTING DATA FROM A FIELD DEVICE

(71) Applicant: Endress+Hauser Conducta GmbH+Co. KG, Gerlingen (DE)

(72) Inventors: Stefan Robl, Hünxe (DE); Holger Eberhard, Stuttgart (DE); Stefan Kempf, Kornwestheim (DE); Marco Bezzon, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 17/105,561

(22) Filed: Nov. 26, 2020

(65) Prior Publication Data

US 2021/0176306 A1 Jun. 10, 2021

(30) Foreign Application Priority Data

Nov. 27, 2019 (DE) ...................... 10 2019 132 173.5

(51) Int. Cl.
*H04L 41/0803* (2022.01)
*H04L 67/1031* (2022.01)
*H04L 67/00* (2022.01)

(52) U.S. Cl.
CPC ...... *H04L 67/1031* (2013.01); *H04L 41/0803* (2013.01); *H04L 67/34* (2013.01)

(58) Field of Classification Search
CPC .. H04L 67/1031; H04L 67/34; H04L 41/0803
See application file for complete search history.

(56) References Cited

U.S. PATENT DOCUMENTS

| 11,601,484 B2* | 3/2023 | Miller | G06T 19/006 |
| 2006/0200256 A1* | 9/2006 | Mason | G05B 19/056 |
| | | | 700/86 |
| 2007/0210916 A1* | 9/2007 | Ogushi | G06Q 10/0875 |
| | | | 340/506 |
| 2008/0041930 A1* | 2/2008 | Smith | G06F 9/44505 |
| | | | 340/572.1 |
| 2008/0228957 A1* | 9/2008 | Meyer | G05B 19/0426 |
| | | | 710/19 |

(Continued)

FOREIGN PATENT DOCUMENTS

| CN | 102736581 A | 10/2012 |
| CN | 104423367 A | 3/2015 |

(Continued)

*Primary Examiner* — Dhairya A Patel
(74) *Attorney, Agent, or Firm* — Kelly J. Smith; Endress+Hauser (USA) Holding, Inc.

(57) ABSTRACT

The present disclosure relates to a method for configuring step by step for transmission of data from a field device to at least one target system, comprising the steps of: creating a configuration comprising at least one subconfiguration for the field device and a subconfiguration for the target system; transmitting the configuration from the field device to the target system; and transmitting the data from the field device to the target system, wherein the data are forwarded, processed, stored or discarded based on the subconfiguration of the field device in the field device, and wherein the data are processed or stored in the target system based on the subconfiguration of the target system.

17 Claims, 5 Drawing Sheets

(56) References Cited

U.S. PATENT DOCUMENTS

| | | | | |
|---|---|---|---|---|
| 2012/0236769 | A1* | 9/2012 | Powell | G05B 19/0426 |
| | | | | 370/310 |
| 2013/0211547 | A1* | 8/2013 | Buchdunger | G05B 11/012 |
| | | | | 700/11 |
| 2013/0272223 | A1* | 10/2013 | Mathews | H04W 4/70 |
| | | | | 370/329 |
| 2016/0112582 | A1* | 4/2016 | Haraguchi | H04N 1/32374 |
| | | | | 348/207.11 |
| 2017/0366525 | A1* | 12/2017 | Takagi | H04L 63/0435 |
| 2018/0131741 | A1* | 5/2018 | Song | H04N 21/8193 |
| 2019/0088022 | A1* | 3/2019 | Ochiai | G06T 19/006 |
| 2019/0113898 | A1* | 4/2019 | Mori | G05B 19/042 |
| 2019/0129675 | A1* | 5/2019 | Ochiai | H04M 11/00 |
| 2020/0096556 | A1* | 3/2020 | Plum | G11C 29/12005 |
| 2020/0216079 | A1* | 7/2020 | Mahajan | B60W 60/0051 |
| 2021/0260317 | A1* | 8/2021 | Freeman | A61M 16/0069 |
| 2021/0264225 | A1* | 8/2021 | McCarson | G06V 20/13 |
| 2021/0312602 | A1* | 10/2021 | Imade | H04N 5/77 |
| 2023/0075276 | A1* | 3/2023 | Zhu | H04L 41/0803 |

FOREIGN PATENT DOCUMENTS

| | | |
|---|---|---|
| CN | 107896509 A | 4/2018 |
| CN | 108462572 A1 | 8/2018 |
| WO | 2018220431 A1 | 12/2018 |

\* cited by examiner

CONFIGURATION METHOD FOR TRANSMITTING DATA FROM A FIELD DEVICE

CROSS-REFERENCE TO RELATED APPLICATION

The present application is related to and claims the priority benefit of German Patent Application No. 10 2019 132 173.5, filed on Nov. 27, 2019, the entire contents of which are incorporated herein by reference.

TECHNICAL FIELD

The present disclosure relates to a method for configuring the transmission of data step by step from a field device to at least one target system.

BACKGROUND

A field device is a technical device in the field of automation technology, which is directly related to a production process. In automation technology, "field" designates the area outside of switchgear cabinets and control rooms, respectively. Field devices can thus be actuators (control elements, valves, etc.) along with sensors or measuring transducers in factory and process automation.

Field devices from the field of process automation communicate with a process control system via what are known as plant networks (for example, the field buses HART, PROFIBUS, PROFINET, etc.). If a user would like to connect the field devices to further information processing systems (for example, database servers, cloud services, etc.), this can nowadays be implemented by means of "edge devices", which are offered specifically for the different plant network types. Such systems read the desired data from the field devices via the plant network and transmit such data in an additional data network separate therefrom to the provided target system. An edge device is a device that offers an entry point into the plant network. Examples of this are routers, routing switches or special access devices, for instance via the intranet. Under the circumstances, edge devices may also offer connections to carrier and service provider networks. Edge devices may translate between one type of network protocol and another.

As an alternative to edge devices, the Namur Open Architecture provides an OPC/UA gateway, which realizes the concept of the data diode by means of OPC/UA security mechanisms and generates the information model from an FDI package provided by the device manufacturer. This gateway may be realized as a software component in the process control system or as a separate connectivity server. In this way, the data of the field devices may be accessed in generic form independently of the concrete planned network. However, in order to be able to forward the data to another information handling system, an additional communication node (e. g. gateway) must mediate between the specified OPC/UA gateway and the target system.

In both embodiments, there is the problem that the mediating systems (edge device or gateway) require an application-specific configuration, which contains information about which data, in which form and at which frequency are needed by which field device and are to be transported to which target system.

As a rule, edge devices in particular are proprietary, i.e. closed systems which do not possess an open data interface which would enable a gateway of a third party access to the required data.

Even if access to the data is possible, application-specific settings must be made in the installation system of the user, so that the required data may reach the target system. If the composition of the data required by the target system changes over time (for example due to configuration changes), this requires intervention in the installation system of the user, which in practice is less practical due to the manual intervention of the user at a central location.

Manual intervention also requires the user to be well familiar with the individual systems in order to achieve a correct configuration. This requires the user to have a high level of expert knowledge about the overall system, which may consist of many individual components of different manufacturers.

SUMMARY

The present disclosure is based on the object of designing the connection between field devices and superordinate information-processing target systems, in such a way that a high degree of flexibility with respect to the underlying communication infrastructure is ensured, and at the same time the configuration outlay incurred for the user is minimized.

The object is achieved by a method comprising the steps of: creating a configuration comprising at least one subconfiguration for the field device and a subconfiguration for the target system; transmitting the configuration from the field device to the target system; and transmitting the data from the field device to the target system, wherein the data in the field device are forwarded, processed, stored or discarded based on the subconfiguration of the field device, and wherein the data are processed or stored in the target system based on the subconfiguration of the target system.

By means of the method presented above, it is possible that a field device manufacturer is placed in the position, for example via a cloud infrastructure (a "target system" in the sense of the method; see below) of offering a user "cloud apps" which may access the data of the field devices that are used. A dedicated, i.e. manual, configuration of all communication nodes involved in data transmission is thereby avoided.

The type (data format) and quality (for example, resolution, sampling frequency) of the data provided by the field device do not necessarily correspond to the requirements of the target system, thus for example a cloud application. The method gives rise to a flexible possibility for the participating communication nodes to be able to independently implement the required data adaptations, without explicit software update or manual intervention.

The communication is thereby designed in such a way that an unwanted external manipulation of a field device is reliably prevented, and a negative influence on the internal system security is thereby precluded. At the same time, however, for the user the method is structured so transparently that such user may obtain a clear understanding of the properties of the communication connection already at "first glance," without deep security analyses.

In principle, one or more target systems are possible, i.e. the field device may also transmit data simultaneously or sequentially to different target systems. The data flow thereby potentially splits at every point at which data are forwarded to a further location. An entire data flow tree thus potentially arises.

One embodiment provides that one or more intermediate systems are interposed on the data path between field device and target system; such intermediate systems respectively consider the relevant subconfiguration of the configuration transmitted to them and to forward, process, store or discard the received data based on their subconfiguration.

One embodiment provides that the subconfiguration for the field device is designed in such a way that the data in the field device are thereby forwarded, processed, stored or discarded in such a way that an intermediate system following in the data flow is in the position to deal with such data.

One embodiment provides that the subconfiguration for the intermediate system is designed in such a way that the data in the intermediate system are forwarded, processed, stored or discarded in such a way that a further intermediate system, or the target system, following in the data flow is in the position to deal with such data.

One embodiment provides that the respective subconfiguration of the transmitting system is removed from the configuration forwarded to the subsequent intermediate system. Thus, each source of data removes the forwarded configuration for its own subconfiguration. In particular in the event of a plurality of target systems, all subconfigurations and data which do not pertain to the respective following branch in the communication flow are removed.

One embodiment provides that the configuration and data are sent in a container format.

One embodiment provides that the configuration is sent cyclically.

One embodiment provides that the data are changed by the at least one intermediate system, in particular based on the respective subconfiguration. In one embodiment, the subconfiguration of the field device may already instruct it to modify the data before transmission. Effectively, each subconfiguration may direct a data processing in the respective system or intermediate system.

One embodiment provides that the subconfiguration includes respective information relating to target address, sampling interval, communication parameters, in particular dial-in nodes, interface speeds and/or data formats, time stamps, software fragments, in particular scripts and/or program modules, serial number and/or names of the field device, of the at least one intermediate system, and/or of the target system, or a programming interface of the field device, of the at least one intermediate system, and/or of the target system.

One embodiment provides that the data comprise information regarding the status and/or system information of the field device, of systems connected to the field device, in particular sensors, and/or of the intermediate system, and/or process values, such as those measured values of systems connected to the field device, such as sensors.

One embodiment provides that the target system is designed as at least one system for cloud computing and/or storing the data.

In one embodiment, the target system is a data logger, a display, an SPS (which thus receives its program and the data controlling it) or another field device, in particular an actuator, for instance a control valve, which is controlled by the transported user data.

As already explained above, the target system may be the sole connection partner of the field device. The configuration then describes the subconfiguration of the field device and the target system at the same time; a manual individual configuration of the two systems is dispensed with.

One embodiment provides that the configuration is encrypted, and/or provided with a signature and/or provided with a checksum.

One embodiment provides that the sending of the data and the configuration takes place exclusively unidirectionally.

One embodiment provides that the subconfiguration of the field device, of the at least one intermediate system, and/or of the target system is created at the field device.

One embodiment provides that the subconfiguration of the field device, of the at least one intermediate system, and/or of the target system is created by means of a mobile app, web app, web application, progressive web app or application software for a mobile device or a personal computer.

The object is further achieved by a field device which is suitable for executing the steps of the method described above.

In one embodiment, the field device is a measuring transducer. In general, a measuring transducer is a device that converts an input variable into an output variable according to a fixed relationship. The English term "transmitter" is also frequently used. Here, for example, the "Liquiline M CM42" product or the "Liquiline CM444" 4-channel measuring transducer from the applicant is to be mentioned as an example of a measuring transducer for pH/redox, conductivity-oxygen measurements or other measurements in process automation applications.

One embodiment provides that the sending of the data and the configuration takes place exclusively unidirectionally in the direction from field device to target system and/to or the intermediate system(s). The field device thus acts as a data diode at its data output.

In one embodiment, the field device comprises a return channel which enables a data connection to the field device from the target device and/or the intermediate system(s).

In one embodiment, the return channel comprises a switch, in particular a mechanical and/or electrical switch, which closes the return channel.

One embodiment provides that the field device comprises an expansion component, wherein the expansion component comprises at least one data processing unit, a memory and a communication interface to a subsequent intermediate system and/or to the target system.

One embodiment provides that the expansion component is a plug-in module in the field device.

One embodiment provides that the field device comprises at least two intermediate systems, and that these are structured hierarchically. Starting from the field device, an arbitrarily complex branching tree in the communication flow may result: Each node, i.e. each intermediate system, may in turn forward the data to one or more other nodes (intermediate systems).

The object is further achieved by a computer program comprising commands which have the effect that the field device as described above executes the method steps as described above.

The object is further achieved by a computer-readable medium on which the computer program as described above is stored.

By means of the present application, it is thus possible to connect a field device to superordinate information processing systems. Data transmission thereby takes place in unidirectionally in a forward direction, for example, and may take place via any number of communication nodes. Data transmission takes place approximately in the form of a container format data packet forwarded step-by-step, which data packet may be modified by each communication node and supplemented with additional useful data. Starting from the first communication node, the container format data packet contains the configuration that configures the complete communication path. The data communication may thereby be entirely configured from a single starting point, without the user needing to contact the individual communication nodes per se and to configure them in a dedicated manner.

BRIEF DESCRIPTION OF THE DRAWINGS

This is explained in more detail with reference to the following figures.

DETAILED DESCRIPTION

Figure 1A:
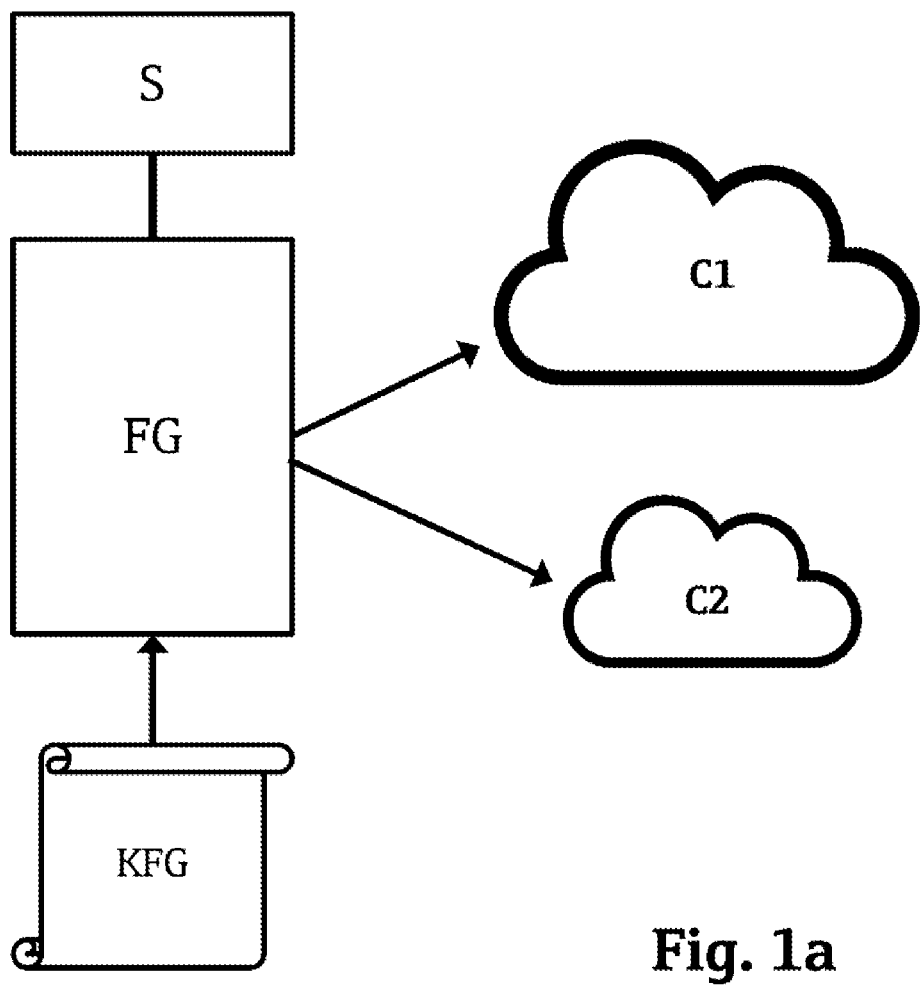
FIG. 1a shows an overview of the claimed method in a first variant.

FIG. 1a/b firstly show an overview of the method. The method serves to configure the transmission of data from a field device FG to a target system. One or more intermediate systems may be present between the field device FG and the target device, these being denoted by "I," i.e. I1, I2, I3, etc. Multiple target systems may likewise be present, these being denoted by "C," i.e. C1 and C2.

In the example, the field device FG is designed as a measuring transducer. One or more sensors are connected to the field device FG. The sensor S comprises at least one sensor element for detecting a measurement variable of the process automation. The sensor S is then, for instance, a pH sensor, also as an ISFET, generally an ion-selective sensor, a sensor for measuring the redox potential, the absorption of electromagnetic waves in the medium, for example with wavelengths in the UV, IR, and/or visible range, oxygen, conductivity, turbidity, the concentration of non-metallic materials or the temperature with the respective corresponding measurement variables.

The measurement transducer FG is connected to the sensor S via an interface. Values dependent on the measurement variable are transmitted via the interface, for example.

The measuring transducer FG is connected to a superordinate unit, for instance a control system PLS, via a cable. This is represented by the reference character "Db" in FIG. 2. The interface between sensor S and measurement transducer FG is, for instance, designed as a galvanically isolated interface, in particular as an inductive interface. The mechanical plug connection of the interface is hermetically sealed, so that no fluid, for instance the medium to be measured, air or dust, may penetrate from the outside.

A plurality of sensors S may also be connected to a measuring transducer FG. The same or different sensors can be connected. For example, up to eight sensors may be connected to the measuring transducer FG.

Data (bidirectionally) and energy (unidirectionally, i.e. from the measuring transducer FG to the sensor S) are sent or transmitted via the appropriate interface. The arrangement is used predominantly in process automation.

For this purpose, the measuring transducer FG converts the data into a data format that the control system PLS can understand, for instance into a corresponding bus such as HART, Profibus PA, Profibus DP, Foundation Fieldbus, Modbus RS485, or even into an Ethernet-based field bus such as Ethernet/IP, Profinet or Modbus/TCP, and/or over 4 . . . 20 mA. Such data are then forwarded to the control system PLS. This may, if required, be combined with a web server, i.e., they may be operated in parallel with one another.

The data to be transmitted, which are also referred to as useful data, are information regarding the status and/or system information of the field device FG, of systems connected to the field device FG, in particular sensors S, and/or of the intermediate system I, and/or process values, in particular measured values of systems connected to the field device FG, in particular sensors S.

Figure 1B:
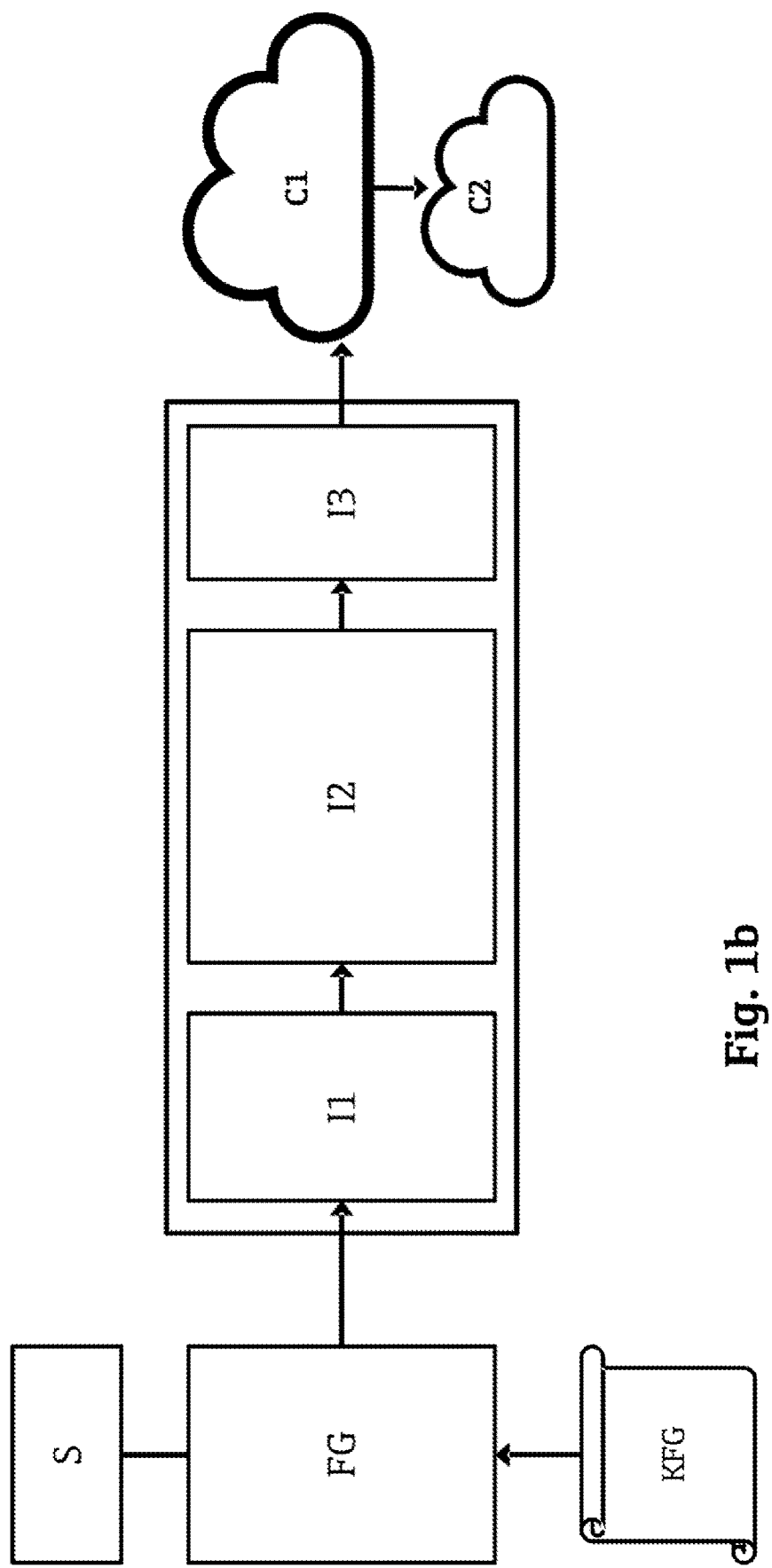
FIG. 1b shows an overview of the claimed method in another variant.

In FIG. 1a, the field device FG is connected to a first target system C1 and in parallel to a second target system C2. Moreover, only one target system C1 may be connected to the field device. In FIG. 1b, the field device FG is connected via a plurality of intermediate systems I to a first target system C1, and this is connected to a second target system C2.

Figure 3:
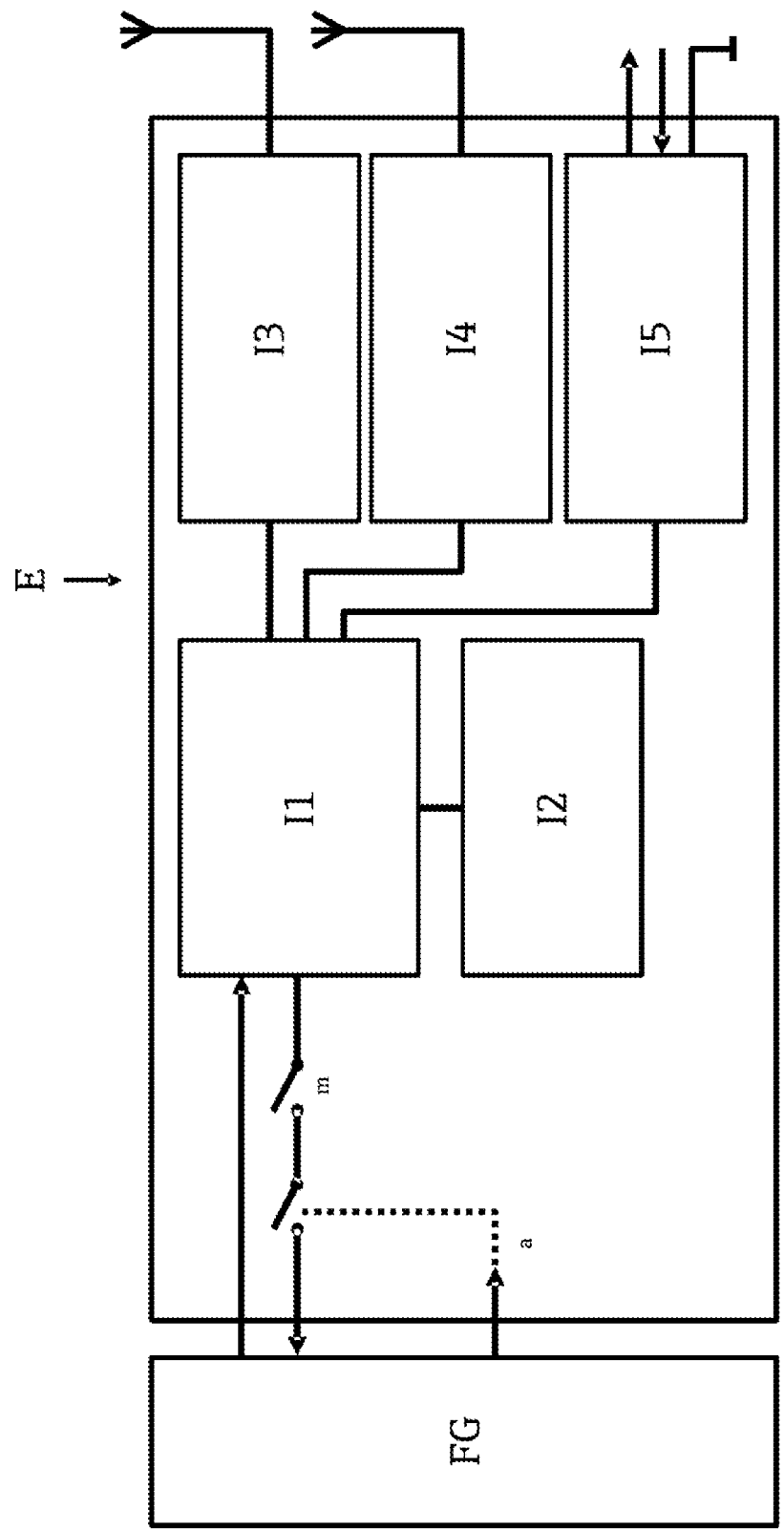
FIG. 3 shows an overview of the field device with an expansion component.

One or more intermediate systems I may reside on an expansion component E; see FIG. 3. The expansion component E may be configured as an independent component or as part of the field device; see below. The intermediate systems may be designed as software modules and/or comprise hardware components; see below. The intermediate module I may be a component inside the field device FG. The intermediate module I may also be an arbitrary computer on the network, wherein potentially any number of these are connected in series.

FIG. 1b shows an embodiment with three intermediate systems I1, I2 and I3 connected in series. For example, I1 is thereby a microcontroller or a system-on-a-chip an operating system running thereon and corresponding applications. I2 is a (software) module for data processing, for instance for forwarding, processing or storage. I3 is a module for communication, for instance a wireless module such as an LTE modem, WiFi router, etc., or a wired module such as an Ethernet module. FIG. 3 shows an embodiment of FIG. 1b with five intermediate systems I1, I2, I3, I4, and I5. As above, I1 may be designed as a microcontroller or a system-on-a-chip an operating system running on it and corresponding applications.

I2 is a memory which stores either only the data ND and/or on which the operating system for I1 is stored. I3 may be a first communication module, for instance an LTE modem, GPRS, a long range wide area network module, etc. I4 may be a parallel communication module for WiFi. I5 can be an RS232 interface. The cited intermediate systems I1-I5 are located on the expansion component E. The expansion component E is designed as a plug-in card in the field device FG, for instance.

As already mentioned, however, the intermediate systems I may also be designed as separate systems, for example different computers on the network.

The target system is, for example, designed as a system for cloud computing and/or storage of data. Computations with the data may thus be performed in the target system. In the addressed embodiment, the target system may be a system for storing the data, for example via a hard disk, server, SD card, USB data medium, etc. In general, the target system is a system which stores and/or processes data external to the field device. The target system may also be another field device, for instance a sensor or actuator (for example, an actuator, valve, . . . ).

Figure 2:
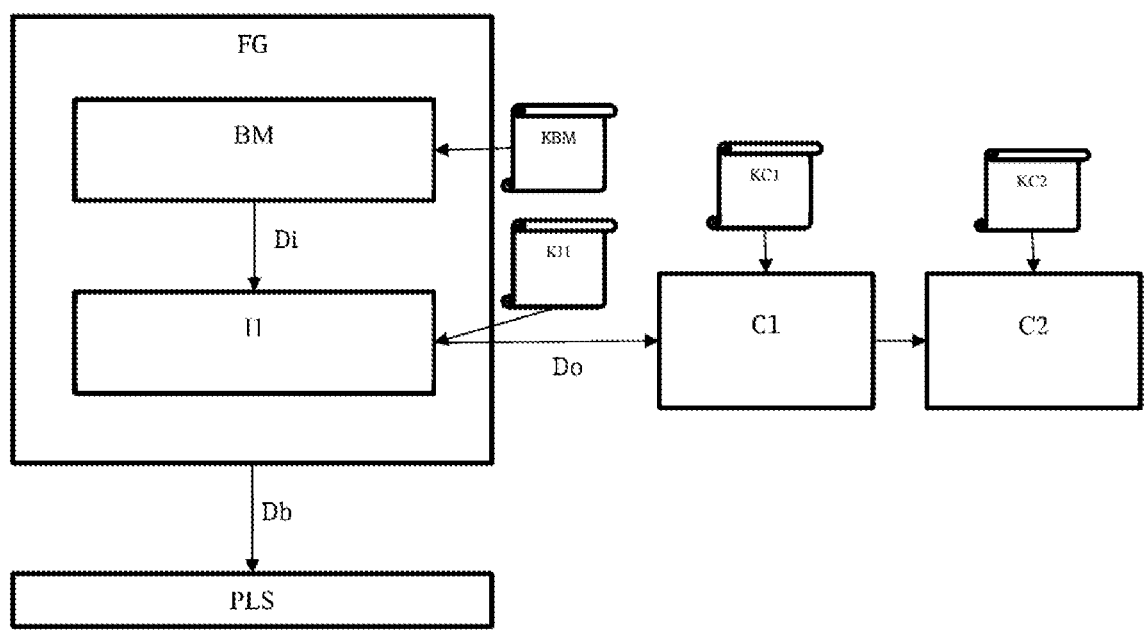
FIG. 2 shows an overview with an embodiment in the field device.

FIG. 2 shows the schematic design of a communication connection from field device FG to a target system C1. The field device FG is connected to an information-processing target system C1 by means of an (external) data connection Do, for example via Ethernet, WLAN, LTE or the like. For this purpose, a data connection Di ("internal data connection") is implemented within the field device FG via a communication module I1. The communication module I1 receives its data via the internal data connection Di, which is connected to the base module BM. The communication module here is designed as a first intermediate system I1 and may be located directly in the field device, remote therefrom, or in the field device but on another hardware module. The base module BM of the field device is designed as a microcontroller, for example. The base module BM is the first member in the chain of configuration K and forms the original data source.

The data connection Di is thereby unidirectional; i.e., there is physically only one data line transferring from the base module BM to the first intermediate system I1. A return channel, even for the purpose of a potential error correction, initially does not exist. An influencing of the base module BM via external manipulation by means of the intermediate system I1, for example by an external attacker, may thereby be guaranteed to be precluded. Thus, even if the intermediate systems I1 were compromised, an influence on the correct operation of the base module BM may be precluded. The process control system PLS connected to the field device FG via the fieldbus Db may therefore reliably continue to operate, completely unimpaired, even in this instance.

As mentioned, the base module BM and the intermediate systems I1, I2, I3 may be realized in the form of separate hardware modules within the field device FG; however, both function modules may also be realized in the form of an integrated hardware circuit on a circuit board. It is hereby always decisive that the base module and (at least the first) intermediate system I1 are connected to one another in terms of data only via the aforementioned one (serial) data line, without return channel.

In one embodiment, a (temporarily) connectable return channel is only optionally provided, which allows a data transfer from the outside world into the field device. The connection might be enabled in the form of a plug-in bridge, a hardware switch or an electronic switch (transistor, digital gate, relay, . . . ) or a series circuit of the specified variants. The return channel may be desired to simplify service measures, for example, but is not necessary for the basic functioning of the method. See in this regard FIG. 3, where a return channel can be opened by automatically (reference character "a") and/or manually (reference character "m") closing one or more switches.

So that the required data may be provided at the target system (here: cloud service C2), a configuration KBM must be stored in the base module BM, so that this periodically be emitted the data referenced there via the internal data connection Di. Each configuration in the sense of this application is designated by the respective preceding reference symbol "K". The configuration KBM is a subconfiguration.

As a rule, each further communication node needs its own configuration information, thus further subconfigurations, so that the forwarding of the data may take place. In the example in FIG. 2, the intermediate system I1 with the subconfiguration KI1 must know the target address of the target system C1, the data format to be used, the API to be used at the target system C1, the sampling interval, etc. This required information is contained in the subconfiguration KI1 which the intermediate system I1 must receive. Similarly, the target system C1 comprises a subconfiguration KC1 and the target system C2 comprises a sub configuration KC2.

So that the user needs to implement a separate connection with each communication node to assign the configuration, the method described here provides for the transport of all subconfigurations required in the communication path together with the payload data ND, starting from the base module BM.

A subconfiguration is thus created for each communication node.

Figure 4:
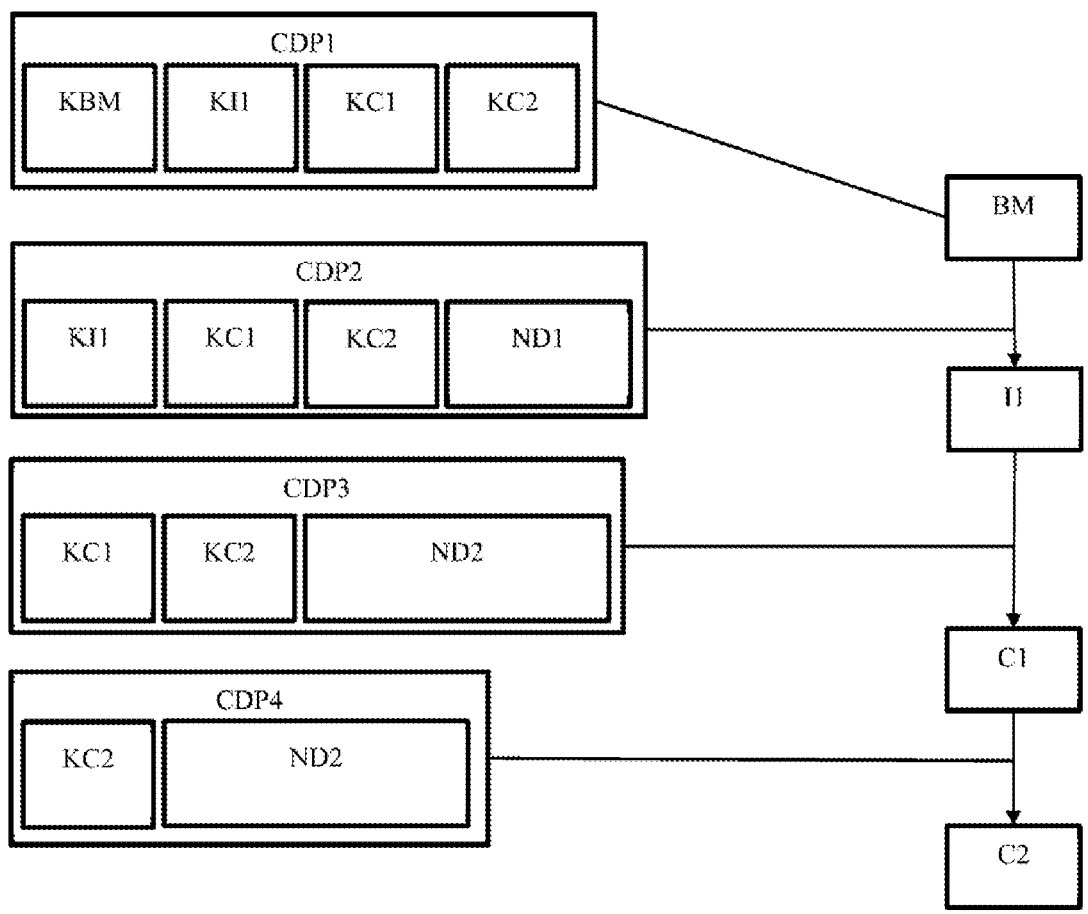
FIG. 4 shows an overview of the course of the data.

A container data format, for example DER or XML, is used to transport the data, and a container data packet CDP is thereby formed (see FIG. 4 in this regard). The container data format may integrate any number of different data. A container data format specifies a data structure with which individual data streams of different formats are merged to form a data stream, here the container data packet CDP.

All subconfigurations together form a configuration. The configuration forms the container data packet CDP in addition to the payload data.

The container data packet CDP is either generated by the user via the on-site operating capability of the field device FG or is transferred via a data interface (fieldbus Db, via the field device or otherwise provided web server or the like) or a storage medium (for example, SD card) into the field device FG; see also below. In an embodiment, a container data packet CDP may also already be present (for example, as part of the firmware) in the base module BM.

The container data packet CDP is numbered from CDP1 to CDP4 in FIG. 4, depending on the position in the data path.

The base module BM extracts the configuration KBM from the container data packet CDP, whereby, from the plurality of data created in the base module BM, the base module BM may package those data which are then relevant to the application and integrate them as a payload data component ND into the container data packet CDP. The base module BM periodically emits the container data packet CDP now modified tin such a manner to the first intermediate system I1 via the single data connection Di. It is hereby essential that the data ND and the configuration are transported in the same data packet. The container data packet CDP is secured by checksums, so that the recipient may detect whether the container data packet CDP is error-free. Since the communication takes place unidirectionally, retransmission in the event of error is not possible; the packet is discarded by the recipient, and such recipient waits for the next cyclically arriving packet.

The intermediate system I1 extracts from the container data packet CDP the subconfiguration KI1 intended for it, modifies or supplements the payload data contained in the container data packet CDP. In FIG. 4 this is illustrated in that payload data with the reference character ND2 are from the payload data with the reference character ND1. The modified container data packet CDP is then forwarded to the target system C1. The process repeats for any number of communication nodes until the container data packet CDP has reached the target system (C2 in the example).

By means of the described method, forward data communication is able to fully automatically configure the complete communication path, or the communication nodes required for this purpose (in the example in FIG. 4 via the base module BM, the intermediate system I1, and the target systems C1 and C2), without manual intervention. The stepped further transport of the container data packet CDP between the communication nodes ultimately configures the complete route fully automatically; the payload data are transformed at the required locations and thus reach their target.

As already addressed briefly above, arbitrary meta-information may be located in the configuration data K. Examples are address information, communication parameters (dial-in nodes, interface speeds, data formats), but also software fragments (scripts, modules or the like) which are required and executed by the respective communication node. In this way, a highly flexible transformation of the payload data to be transmitted is possible, so that the data may be transported over a wide variety of data interfaces. Further examples of meta-information are time stamps, serial numbers/names of the participating communication nodes. If an intermediate system or target system uses, for example, a REST API (Representational State Transfer Application Programming Interface) for communication, the meta-information may include the REST syntax (Representational State Transfer Application) to be used.

The information contained in the container data packet CDP may optionally be protected from unauthorized reading by third parties via encryption and signature methods, or the modification of the container data packet CDP by attackers may be prevented. For example, the base module BM may digitally sign the payload data ND, and each communication node, in particular the target system C2 at the end, may check whether the data is uncorrupted. In the same way, the data can also be encrypted end-to-end.

As described, the initial container data packet CDP is formed by a configuration via the on-site operating capabilities of the field device FG, or via an external data source (for instance an SD card). Furthermore, it is possible for the user to create the Container Data Packet CDP via a mobile app, web app, web application or progressive web app. This take place on a mobile device or a personal computer. The creation may also take place via a web page, for example provided by a web server.

The user creates the container data packet CDP with the aid of a comfortably designed interface and, for example, configures the type of data to be visualized and the type of data preparation to be used. The interface is a cloud application, for example. If all the settings have been made, the container data packet designated as "CDP1" in FIG. 4 is created, which is loaded into the field device FG by the user. This data transport may take place via the existing process control system and the employed field bus, a web server integrated in the field device FG, a wireless connection or a data storage medium (for example, SD card). In addition, it is conceivable in this instance that the user temporarily opens the previously described return channel only for the duration of data transport, so that the container data packet CDP may arrive at the field device FG directly from the interface described above.

After the container data packet CDP has been loaded from the interface, i.e. for instance the cloud application, into the field device FG, the previously described forward communication workflow begins, in which the container data packet CDP configures the complete communication path in steps and the container data packet CDP is incrementally supplemented with the payload data by the communication nodes.

For the user, this results in a very comfortable way of configuring the entire data communication path, while at the same time maximizing security against malicious manipulation by third parties.

Although the data communication path is exclusively forward, it is not one-dimensional. It is readily conceivable that multiple branches of the data flow to multiple other communication nodes take place at individual communication nodes. For example, a plurality of separate target systems could simultaneously receive data from a field device FG. For example, data may be sent to a cloud computing service, which data are also further processed there. At the same time, a copy of the data could be stored on a storage medium.

The invention claimed is:

1. A method for step-by-step configuration for transmitting data from a field device to at least one target system, comprising the steps of:
creating a configuration for electronically transmitting the data;
loading at least one subconfiguration on the field device;
loading at least one subconfiguration on the target system;
sending the configuration from the field device to the target system, and
sending the data from the field device to the target system,
wherein the data are forwarded, processed, stored or discarded in the field device based on the subconfiguration of the field device,
wherein the data are processed or stored in the target system based on the subconfiguration of the target system, and
wherein the respective subconfiguration of the transmitting system is automatically removed from the configuration advanced to the subsequent intermediate system;
wherein one or more intermediate systems are interposed in the data path between field device and target system; these respectively take into account the relevant subconfiguration of the configuration transmitted to them and forward, process, store or discard the received data based on their subconfiguration;
wherein each subconfiguration includes the data format to be used by the subsequent intermediate system or the target system.

2. The method of claim 1, wherein the subconfiguration for the intermediate system is designed in such a way that the data in the intermediate system are forwarded, processed, stored or discarded in such a way that a subsequent further intermediate system, or the target system, in the data flow is able to handle this data.

3. The method of claim 1, wherein the configuration and the data are sent in a container format.

4. The method of claim 1, wherein the configuration is transmitted cyclically.

5. The method of claim 1, wherein the data are changed by the at least one intermediate system, in particular based on the respective subconfiguration.

6. The method of claim 1, wherein the subconfiguration includes respective information relating to target address, sampling interval, communication parameters, dial-in nodes, interface speeds or data formats, time stamps, software fragments, scripts or program modules, serial numbers or names of the field device, of the at least one intermediate system, or of the target system, or a programming interface of the field device, of the at least one intermediate system, or of the target system.

7. The method of claim 1, wherein the data are information regarding the status or system information of the field device, systems connected to the field device or of the intermediate system, or process values.

8. The method of claim 1, wherein the target system is designed as at least one system for cloud computing or storing data.

9. The method of claim 1, wherein the configuration is encrypted or provided with a signature or provided with a checksum, wherein the configuration is encrypted or provided with a signature or provided with a checksum.

10. The method of claim 1, wherein the sending of the data and the configuration takes place exclusively unidirectionally.

11. The method of claim 1, wherein the subconfiguration of the field device, of the at least one intermediate system, or of the target system is created at the field device.

12. The method of claim 1, wherein the subconfiguration of the field device, of the at least one intermediate system, or of the target system is created by means of a mobile app, web app, web application, progressive web app or application software for a mobile device or a personal computer.

13. A field device, comprising:
the field device configured to execute the following steps:
creating a configuration for electronically transmitting the data;
loading at least one subconfiguration on the field device;
loading at least one subconfiguration on the target system;
sending the configuration from the field device to the target system, and
sending the data from the field device to the target system,
wherein the data are forwarded, processed, stored or discarded in the field device based on the subconfiguration of the field device,
wherein the data are processed or stored in the target system based on the subconfiguration of the target system, and
wherein the respective subconfiguration of the transmitting system is automatically removed from the configuration advanced to the subsequent intermediate system;
wherein one or more intermediate systems are interposed in the data path between field device and target system; these respectively take into account the relevant subconfiguration of the configuration transmitted to them and forward, process, store or discard the received data based on their subconfiguration;
wherein each subconfiguration includes the data format to be used by the subsequent intermediate system or the target system.

14. The field device of claim 13, wherein the field device comprises an expansion component, wherein the expansion component comprises at least one data processing unit, a memory and a communication interface to a subsequent intermediate system or to the target system.

15. The field device of claim 13, wherein the field device comprises at least two intermediate systems and these are hierarchically structured.

16. A non-transitory computer program product comprising commands which have the effect that a field device executes the following method steps:
creating a configuration for electronically transmitting the data;
loading at least one subconfiguration on the field device;
loading at least one subconfiguration on the target system;
sending the configuration from the field device to the target system, and
sending the data from the field device to the target system,
wherein the data are forwarded, processed, stored or discarded in the field device based on the subconfiguration of the field device,
wherein the data are processed or stored in the target system based on the subconfiguration of the target system, and
wherein the respective subconfiguration of the transmitting system is automatically removed from the configuration advanced to the subsequent intermediate system;
wherein one or more intermediate systems are interposed in the data path between field device and target system; these respectively take into account the relevant subconfiguration of the configuration transmitted to them and forward, process, store or discard the received data based on their subconfiguration;
wherein each subconfiguration includes the data format to be used by the subsequent intermediate system or the target system.

17. A non-transitory computer-readable medium on which the following computer program steps are stored:
creating a configuration for electronically transmitting the data;
loading at least one subconfiguration on the field device;
loading at least one subconfiguration on the target system;
sending the configuration from the field device to the target system, and
sending the data from the field device to the target system,
wherein the data are forwarded, processed, stored or discarded in the field device based on the subconfiguration of the field device,
wherein the data are processed or stored in the target system based on the subconfiguration of the target system, and
wherein the respective subconfiguration of the transmitting system is automatically removed from the configuration advanced to the subsequent intermediate system;
wherein one or more intermediate systems are interposed in the data path between field device and target system; these respectively take into account the relevant subconfiguration of the configuration transmitted to them and forward, process, store or discard the received data based on their subconfiguration;
wherein each subconfiguration includes the data format to be used by the subsequent intermediate system or the target system.

* * * * *